United States Patent
Tailor et al.

(10) Patent No.: US 9,609,527 B1
(45) Date of Patent: Mar. 28, 2017

(54) SYSTEMS AND METHODS FOR COORDINATING INTERFERENCE MITIGATION TECHNIQUES AND BEAMFORMING

(71) Applicant: Sprint Spectrum LP, Overland Park, KS (US)

(72) Inventors: Pinalkumari Tailor, Ashburn, VA (US); Yun Sung Kim, Ashburn, VA (US); Sanghoon Sung, Ashburn, VA (US); Dhaval Dipak Mehta, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 117 days.

(21) Appl. No.: 14/566,966

(22) Filed: Dec. 11, 2014

(51) Int. Cl.
*H04W 16/28* (2009.01)
*H04W 72/12* (2009.01)
*H04B 15/00* (2006.01)

(52) U.S. Cl.
CPC ............ *H04W 16/28* (2013.01); *H04B 15/00* (2013.01); *H04W 72/12* (2013.01)

(58) Field of Classification Search
CPC . H04W 72/042; H04W 24/02; H04W 72/082; H04W 84/045; H04W 52/265; H04W 16/28; H04W 52/244; H04W 52/243; H04L 5/0053; H04L 5/0073; H04L 5/0035; H04B 7/024; H04B 7/0617; H04B 7/0413; H04B 17/27

See application file for complete search history.

(56) References Cited

U.S. PATENT DOCUMENTS

| | | | | |
|---|---|---|---|---|
| 2010/0202308 A1* | 8/2010 | Gorokhov | ............ | H04B 7/0417 370/252 |
| 2011/0170424 A1* | 7/2011 | Safavi | ................ | H04L 43/0811 370/242 |
| 2013/0115985 A1 | 5/2013 | Davydov et al. | | |
| 2013/0115999 A1* | 5/2013 | Sirotkin | ............... | H04B 7/0617 455/522 |
| 2013/0295949 A1 | 11/2013 | Seo et al. | | |
| 2013/0301422 A1* | 11/2013 | Caretti | ................. | H04B 1/1027 370/241 |
| 2015/0334653 A1* | 11/2015 | Ang | .................. | H04W 28/0221 370/311 |

(Continued)

OTHER PUBLICATIONS

Kimura et al., Inter-Cell Interference Coordination (ICIC) Technology, Fujitsu Sci. Tech. J., 48:1, pp. 89-94, Jan. 2012.

(Continued)

*Primary Examiner* — Jung Park

(57) ABSTRACT

Systems and methods are described for coordinating interference mitigation techniques and beamforming. Information about transmissions made by at least one access node neighboring a first access node is obtained. Further, profile data for a wireless device within a transmission range of the first access node is obtained. The systems and methods contemplate determining that transmissions from the first access node to the wireless device will utilize beamforming, based upon the profile data for the wireless device. The first access node is instructed to schedule wireless transmissions to the wireless device utilizing beamforming, based upon the determination to use beamforming.

17 Claims, 8 Drawing Sheets

(56) References Cited

U.S. PATENT DOCUMENTS

2015/0358953 A1* 12/2015 Lee .................. H04B 7/024
370/329
2016/0128060 A1* 5/2016 Azarian Yazdi .. H04W 72/0446
370/336

OTHER PUBLICATIONS

Pauli et al., Heterogeneous LTE Networks and Inter-Cell Interference Coordination, Nomor Research GmbH, pp. 1-9, Dec. 2010.
LTE Quick Reference—Beam Forming, http://www.sharetechnote.com/html/Handbook_LTE_BeamForming.html, pp. 1-9 Aug. 3, 2014.
LTE Transmission Modes and Beamforming, White Paper, Rhode & Schwarz, pp. 1-24, May 2014.

* cited by examiner

SYSTEMS AND METHODS FOR COORDINATING INTERFERENCE MITIGATION TECHNIQUES AND BEAMFORMING

TECHNICAL BACKGROUND

Telecommunication systems, such as cellular networks or other wireless networks, use various network links throughout the network to communicate. In a wireless communication network, a wireless device at the edge of an access node coverage area can experience signal interference when frequencies are re-used by neighboring access nodes. Such inter-cell interference (ICI) may degrade data transmission near coverage area edges, reducing data throughput and spectral efficiency to wireless devices near a coverage area edge. In view of this, procedures may be used to mitigate and/or reduce inter-cell interference. In certain circumstances, it may be desirable to implement beamforming for transmissions from an access node to one or more wireless devices. Accordingly, a system that effectively mitigates and/or reduces inter-cell interference while also having the ability to implement beamforming may be able to provide a high quality service to users of the system.

Overview

Systems and methods are described for coordinating interference mitigation techniques and beamforming, the systems and methods comprising obtaining information about transmissions made by at least one access node neighboring a first access node, obtaining profile data for a wireless device within a transmission range of the first access node, determining that transmissions from the first access node to the wireless device will utilize beamforming, based upon the profile data for the wireless device, and instructing the first access node to schedule wireless transmissions to the wireless device utilizing beamforming.

DETAILED DESCRIPTION

Figure 1:
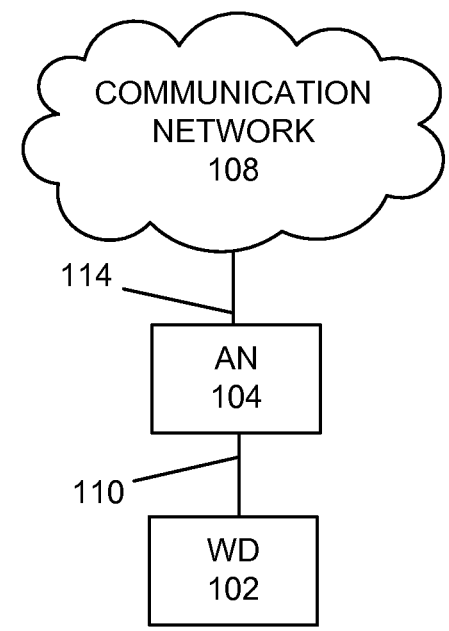
FIG. 1 schematically illustrates an exemplary communication system to perform beamforming at an access node.

FIG. 1 illustrates an exemplary communication system 100 for coordinating interference mitigation techniques and beamforming in a wireless communication network. According to an exemplary embodiment, communication system 100 comprises a wireless device 102, access node 104, and communication network 108. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 108 that are omitted for clarity, including additional processing nodes, routers, gateways, and physical and/or wireless data links for carrying data among the various network elements.

Wireless device 102 can be any device configured to communicate over system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in the exemplary embodiment of FIG. 1 as being in communication with access node 104, any number of wireless devices can be implemented according to the various exemplary embodiments disclosed herein.

Wireless device 102 can transmit and/or receive information over system 100 using various communication services. These services can include various voice, data, and/or MBMS services and applications. Such services may include, for example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access node 104 can be any network node configured to provide communication between wireless device 102 and communication network 108. Access node 104 can be a short range access node or a standard access node. According to an exemplary embodiment, a short range access node could include a microcell base station, a picocell base station, a femtocell base station, or the like and a standard access node could include a base transceiver station, a radio base station, an eNodeB device, or an enhanced eNodeB device, or the like. It is noted that while one access node 104 is illustrated in the exemplary embodiment of FIG. 1, any number of access nodes can be implemented within system 100.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment.

Communication network 108 can be capable of carrying data, for example, to support voice, push-to-talk, broadcast video, and data communications by a wireless device, such as wireless device 102. Wireless network protocols can comprise, for example, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise, for example, Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). According to an exemplary embodiment, communication network 108 can also comprise additional base stations, controller nodes, telephony switches, internet routers, network gateways, computer systems, communication links, or other types of communication equipment, and combinations thereof.

Communication links 110, 114 can be wired or wireless and use various communication protocols such as, for example, Internet, Internet protocol (IP), local-area network (LAN), optical networking, hybrid fiber coax (HFC), telephony, Ti, or some other communication format, including combinations, improvements, or variations thereof. According to an exemplary embodiment, wireless communication links can be, for example, a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used than those specified in the various exemplary embodiments described herein. Links 110, 114 can be a direct link or may include various equipment, intermediate components, systems, and networks, according to an exemplary embodiment.

Figure 2:
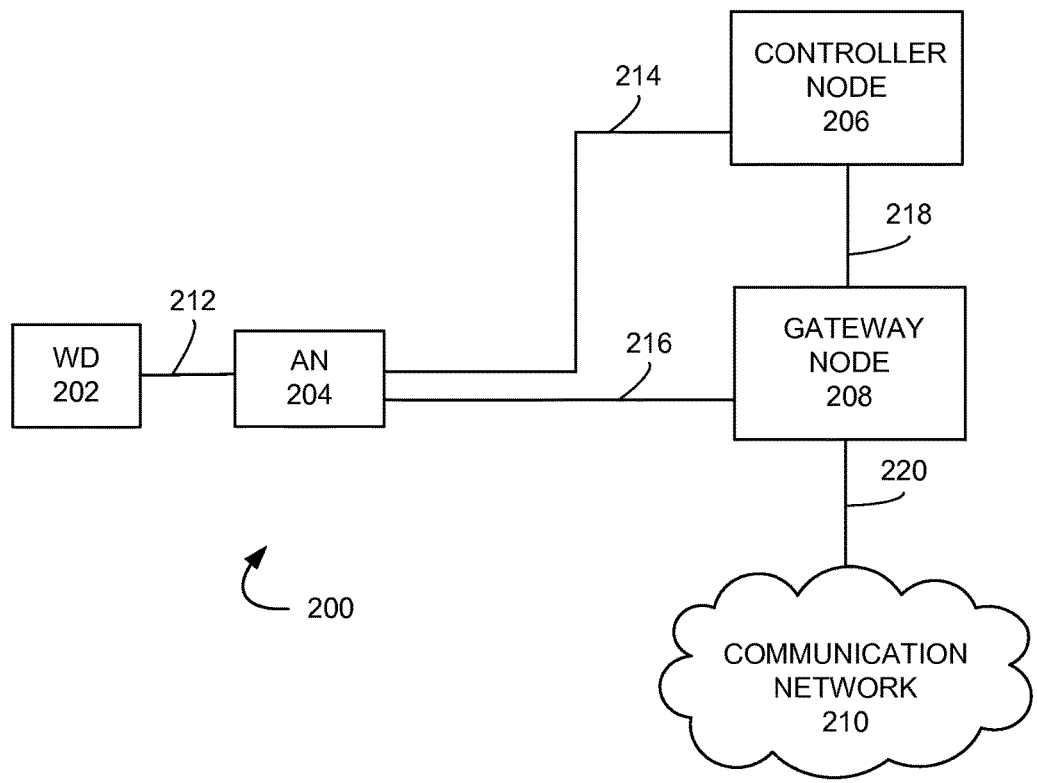
FIG. 2 schematically illustrates an exemplary communication system that performs beamforming.

FIG. 2 illustrates another exemplary communication system 200 to perform beamforming at an access node. Communication system 200 may comprise wireless device 202, access node 204, controller node 206, gateway node 208, communication network 210, and communication links 212, 214, 216, 218, and 220. Other network elements may be present in communication system 200 to facilitate communication but are omitted for clarity, such as base stations, base station controllers, gateways, mobile switching centers, dispatch application processors, and location registers such as a home location register or visitor location register.

Wireless device 202 can be any device configured to communicate over communication system 200 using a wireless communication link. For example, wireless device 202 can include a cell phone, a smart phone, a computing platform such as a laptop, palmtop, or a tablet, a personal digital assistant, or an internet access device, and combinations thereof. Although a single wireless device 202 is depicted in the exemplary embodiment of FIG. 2, other numbers of wireless devices may be used in communication system 200.

Access node 204 is a network node capable of providing wireless communications to wireless device 202, and can be, for example, a base transceiver station, a radio base station, or an eNodeB device. According to an exemplary embodiment, access node 204 can comprise a serving access node for wireless device 202. Access node 204 may communicate with controller node 406 over communication link 214 and with gateway node 208 over communication link 216. When communication system 200 includes a plurality of access nodes (not shown in the exemplary embodiment of FIG. 2), the access nodes may communicate directly with each other over communication links (not shown in FIG. 2) linking the various access nodes to one another.

Controller node 206 can be any network node configured to manage services within system 200. Controller node 206 may provide other control and management functions for system 200. Controller node 206 can be a single device having various functions or a plurality of devices having differing functions, according to an exemplary embodiment. For example, controller node 206 can include at least one of a multi-cell/multicast coordination entity (MCE), a mobility management entity (MME), a radio network controller (RNC), a mobile switching center (MSC), and combinations thereof.

According to an exemplary embodiment, controller node 206 can comprise a processor and associated circuitry to execute or direct the execution of computer-readable instructions to obtain information. Controller node 206 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 406 can receive instructions and other input at a user interface, according to an exemplary embodiment. Controller node 206 can comprise a processor and associated circuitry to execute or direct the execution of computer-readable instructions to obtain information.

Gateway node 208 is a network element that can comprise a processor and associated circuitry to execute or direct the execution of computer-readable instructions, according to an exemplary embodiment. Gateway node 208 may retrieve and execute software from storage. Storage may include, for example, a disk drive, flash drive, memory circuitry, or some other memory device, that can be local or remotely accessible. According to an exemplary embodiment, the software comprises computer programs, firmware, or some other form of machine-readable instructions, and may include an operating system, utilities, drivers, network interfaces, applications, or some other type of software, including combinations thereof. According to an exemplary embodiment, gateway node 208 can provide to access nodes of system 200 (e.g., access node 204) instructions related to channel selection for communications with wireless devices (e.g., wireless device 202). For example, gateway node 208 can comprise at least one of a serving gateway (SGW), a packet data network gateway (PDNGW), a cellular gateway (CGW), and combinations thereof.

Communication network 210 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment. Communication network 210 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 210 comprise, for example, Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 212, 214, 216, 218, and 220 can be wired or wireless communication links, according to an exemplary embodiment. Wired communication links can be, for example, twisted pair cable, coaxial cable or fiber optic cable, or combinations thereof. Wireless communication links can be, for example, a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 200 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 204, controller node 206, gateway node 208, and communication network 210 that are omitted for clarity, including, for example, additional processing nodes, routers, gateways, and physical and/or wireless data links for carrying data among the various network elements. In an embodiment, any of controller node 206, gateway node 208, and one or more modules of the access node(s) (e.g., access node 404) may perform all or parts of the method of FIG. 5, as illustrated in the various exemplary embodiments described herein.

Figure 3:
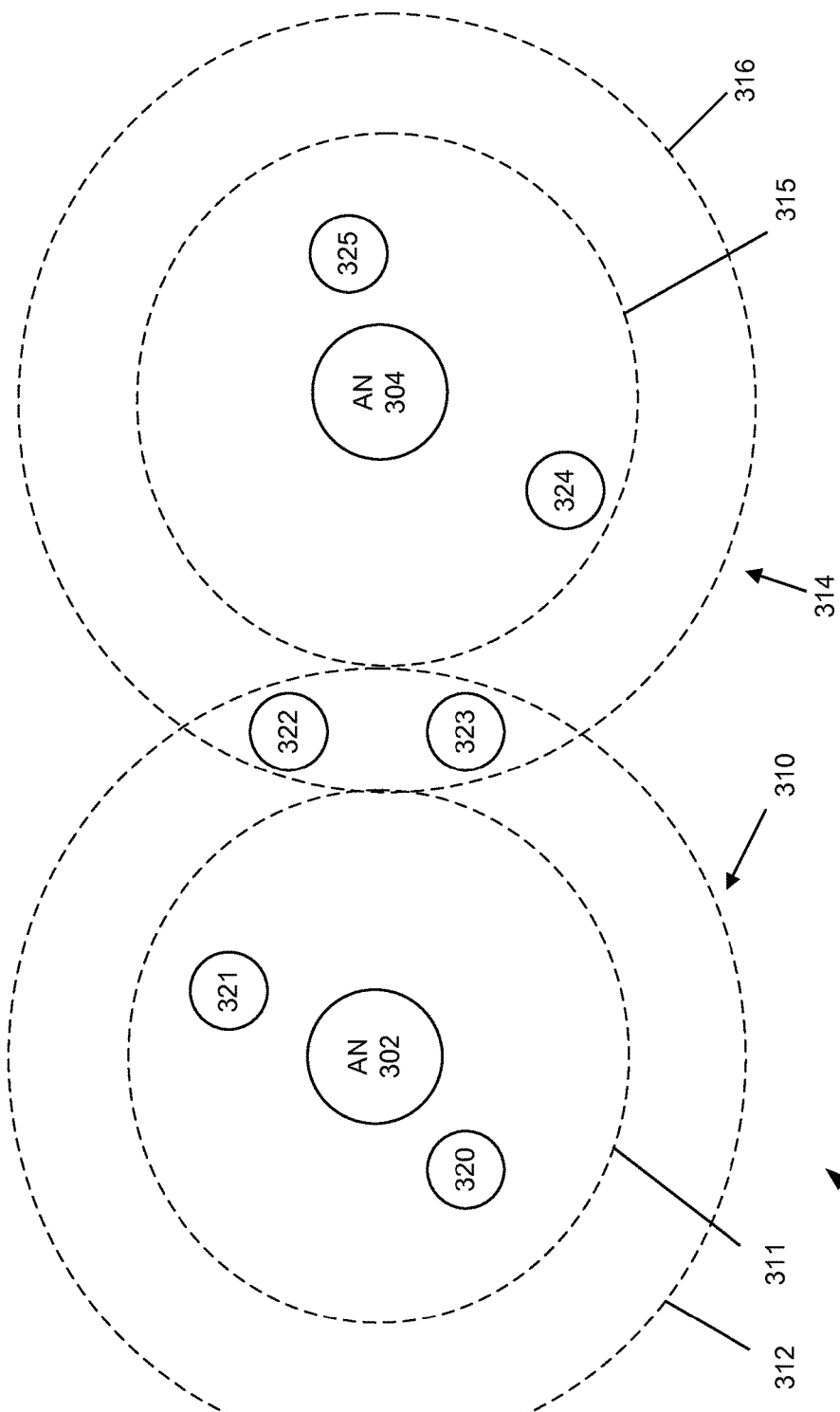
FIG. 3 schematically illustrates an exemplary communication system in which two access nodes potentially interfere with one another.

FIG. 3 illustrates an exemplary system 300 for communicating between access nodes and wireless devices. According to an exemplary embodiment, system 300 comprises wireless devices 320-325; access nodes 302 and 304; and signal areas 310 and 314. Wireless devices 320-325 may each comprise a device similar to wireless devices 102, 202 of the exemplary embodiments of FIGS. 1 and 2. Access nodes 302 and 304 may each comprise an access node similar to access nodes 104 and 204 of the exemplary embodiments of FIGS. 1 and 2.

System 300 may use a plurality of carriers to provide wireless communication services, according to an exemplary embodiment. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may be further divided into subcarriers. According to an exemplary embodiment, a frequency band may comprise a carrier, a channel, a subcarrier, a plurality of any of these, or any other suitable frequency band.

According to an exemplary embodiment, access node 302 may establish communication with wireless devices 320-323, such that access node 302 provides wireless devices 320-323 access to a communication network (e.g., communication network 108 of the exemplary embodiment of FIG. 1). Signal area 310 may comprise an area around access node 302 where a wireless device may detect wireless signals transmitted from access node 302 at a signal level above a threshold. For example, signal area 310 may comprise a coverage area for access node 302, such that wireless devices (e.g., wireless device 320-323) that fall within signal area 310 are provided wireless resources by access node 302. Similarly, access node 304 may establish communication with wireless devices 324 and 325 (and potentially wireless devices 322 and 323), such that access node 304 provides wireless devices 324 and 325 access to a communication network (e.g., communication network 108 of the exemplary embodiment of FIG. 1). Signal area 314 may comprise an area around access node 304 where a wireless device may detect wireless signals transmitted from access node 304 at a signal level above a threshold.

As depicted in the exemplary embodiment of FIG. 3, access nodes 302 and 304 may be neighboring access nodes, which could lead to interference between transmissions of the access nodes 302, 304 in certain situations. For example, the respective signal areas 310 and 314 of access nodes 302 and 304 may overlap one another, as depicted in FIG. 3. Wireless devices that receive transmissions from both access nodes 302 and 304, such as, for example, wireless devices 322 and 323, may experience interference, such as when access nodes 302 and 304 utilize the same over the air resources at the same time. Over the air resources may be, for example, physical reference blocks representing a particular frequency subband at a particular time or time period. Thus, if access node 302 schedules use of a particular resource to one of wireless devices 322 and 323, it is possible for access node 304 to schedule use of the same resource at the same time, leading to interference for the wireless device.

One method of mitigating interference between neighboring access nodes is to allocate sets of resources the access nodes so that neighboring access nodes use different resources at a given time. Although interference is mitigated, such as at edges of signal areas of access nodes, communication services provided by the access node are less efficient because fewer resources are available to each access node.

Another method of mitigating interference between neighboring access nodes involves partitioning signal areas for access nodes. As depicted in the exemplary embodiment of FIG. 3, signal area 310 can be partitioned into a central signal area 311 and a peripheral signal area 312. Similarly, signal area 314 can be partitioned into a central signal area 315 and a peripheral signal area 316. Transmissions scheduled for wireless devices within central signal areas 311 and 315 (e.g., wireless devices 320, 321, 324, 325) may use any over the air resource because there is a low probability of interference between the neighboring access nodes 302, 304 within central signal areas 311, 315. Conversely, access nodes 302 and 304 schedule transmissions for wireless devices within peripheral signal areas 312 and 316 (e.g., wireless devices 322 and 323) so the transmissions do not use the same resources at the same time, in order to mitigate interference. This method of interference mitigation may be further modified by access nodes 302 and 304 using power transmission schemes so that transmission scheduled for peripheral signal areas 312 and 316 have a higher power and transmissions scheduled for within central signal areas 311 and 315 have lower power.

Access nodes may communicate with one another and exchange information regarding the over the air resources used for scheduled transmissions. The link between the access nodes can be wired or wireless and use various communication protocols, as described in the various exemplary embodiments herein. The information can comprise an indication of interference conditions on physical resource block (PRB) level, which indicates if a transmission power for a particular resource will be greater than a power threshold or not. In addition, the information can further comprise information about which resource blocks will be used with a highest transmission power. The information can enable each access node to employ a different transmission power pattern, and/or to configure power transmission levels for different frequency reuse models. Additionally, or alternatively, the information can be used to both indicate frequency selective power allocations as well as scheduling strategies, since both may have an impact on the transmit power per resource in a given time interval. Thus, neighboring access nodes can determine which resources are likely to lead to interference, and thus schedule transmission using different resources. In an embodiment, the information comprises a downlink relative narrowband transmit power (RNTP) indicator. The information may also include information about uplink transmissions. For example, the information may include a high interference indicator (HI) that indicates if high interference power should be expected in the near future, such as for wireless devices located in the periphery of a transmission area for an access node, and include an interference overload indicator (OI) that is triggered when an access node detects high interference for an uplink transmission.

Figure 4:
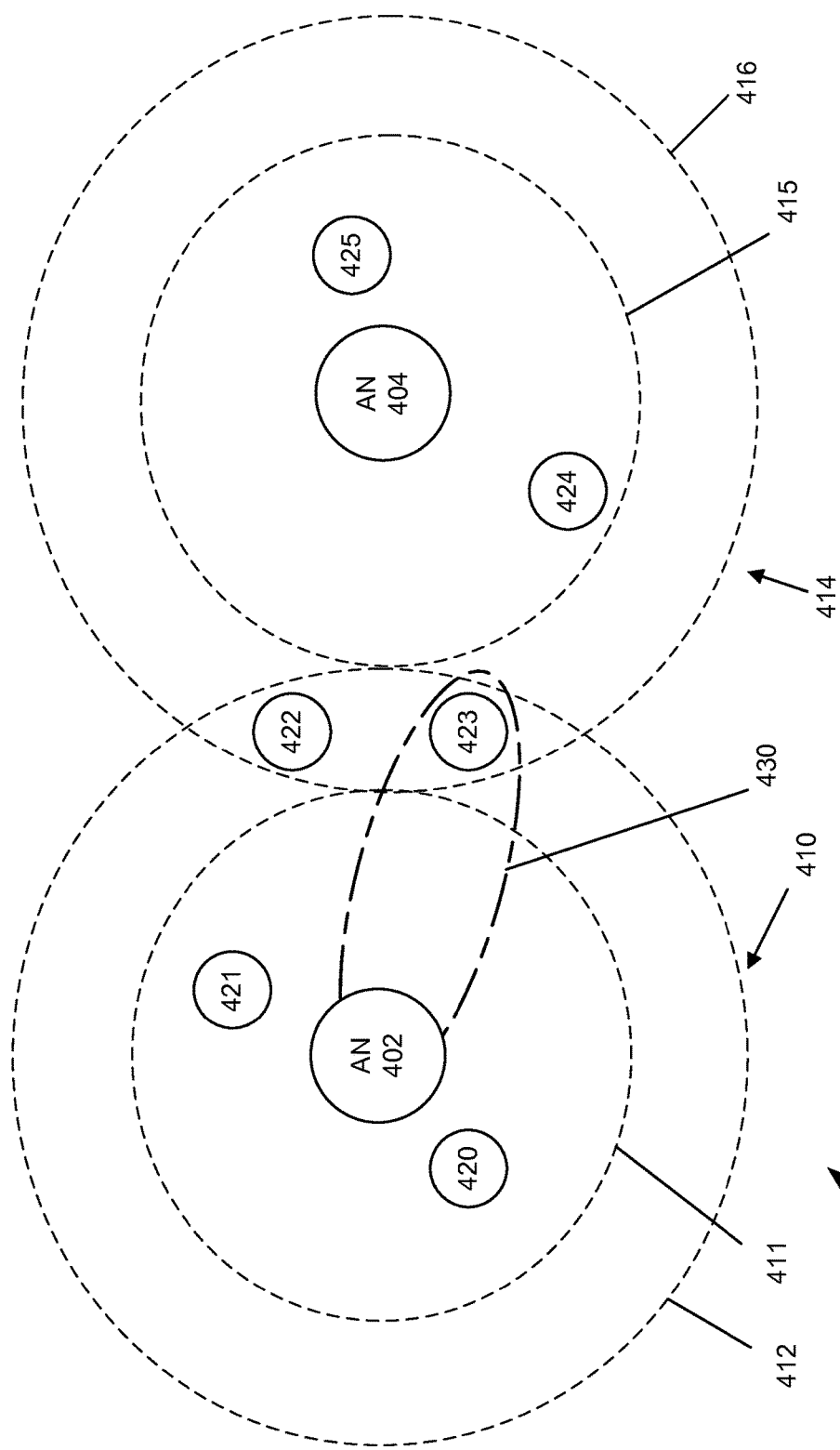
FIG. 4 schematically illustrates an exemplary communication system in which two access nodes potentially interfere with one another and at least one access node performs beamforming.

Services provided to a wireless device via an access node may vary in quality as a result of various factors. For example, FIG. 4 depicts an exemplary system 400, with system 400 including access nodes 402, 404 having respective signal areas 410 and 414 (which may be respectively partitioned to central signal areas 411, 415 and peripheral signal areas 412, 416) for transmissions to wireless devices 420-425, similar to the system 300 of the exemplary embodiment of FIG. 3. Wireless device 422 and 423 in the exemplary embodiment of FIG. 4 may be located at an edge of signal area 410 for access node 402. Accordingly, wireless devices 422, 423 may have a low channel quality (e.g., a channel quality indicator (CQI) is below a predetermined threshold or criteria). The low channel quality may be based on a high interference level for the signals received by wireless devices 422, 423, or other suitable factors.

According to an exemplary embodiment, system 400 may leverage beamforming to enhance the wireless services provided to a wireless device. As depicted in the exemplary embodiment of FIG. 4, access node 402 may perform beamforming such that a signal transmitted to wireless device 423 is adjusted based on the location of wireless device 423. For example, an adjusted beam 430 may be transmitted from access node 402 such that wireless device 423 may experience greater channel quality when communicating with access node 402. According to an exemplary embodiment, the adjusted beam 430 may comprise of signals transmitted over a frequency band assigned to wireless device 423 (e.g., assigned as the frequency band that access node 402 uses to communicate with wireless device 423).

According to an exemplary embodiment, the beamforming may be accomplished using a plurality of antennas at access node 404 that implement, for example, a multiple input multiple output (MIMO) protocol. The signals from each of the plurality of antennas may be controlled such that the net signal from an access node (e.g., access node 402) may be transmitted towards a wireless device (e.g., wireless device 423) as a beamformed signal. In an embodiment, the beam may be formed by weighting the magnitude and/or phase of the signals transmitted by each individual antenna. For example, the signals may be weighted such that the emitted waveform from the antennas experiences constructive interference in the direction of wireless device 423 and destructive interference in other directions (e.g., away from wireless device 423).

System 400 is depicted in the exemplary embodiment of FIG. 4 with access node 402 adjusting beams emitted by access node 402 toward wireless device 423. Adjusted signal beam 430 may be narrowed, for example, towards the location of wireless device 423. In another example, the signals may be weighted such that the emitted waveform from the antennas experiences destructive interference in the direction of wireless device 423, such as, for example, to beamform in directions away from wireless device 423 so the adjusted signal beam is not transmitted towards the location of wireless device 423. According to an exemplary embodiment, the adjusted beam 430 may comprise signals transmitted over a frequency band assigned to wireless device 423 (e.g., assigned as the frequency band that access node 402 uses to communicate with wireless device 423).

In view of the advantages of interference mitigation techniques and beamforming, it would be desirable to provide systems and methods for coordinating the use of interference mitigation techniques and beamforming in communication systems. The various exemplary embodiments described herein contemplate methods and systems to control a transmission mode to wireless devices to minimize interference between neighboring access node while also facilitating beamforming. For instance, the methods and systems of the various exemplary embodiments described herein contemplate obtaining information about transmissions made by at least one neighboring access node and obtaining profile data for wireless devices within a transmission range of an access node. Based upon the wireless device profile data, a determination can be made whether transmissions to the wireless device will utilize beamforming or will utilize an interference mitigation process.

Figure 5:
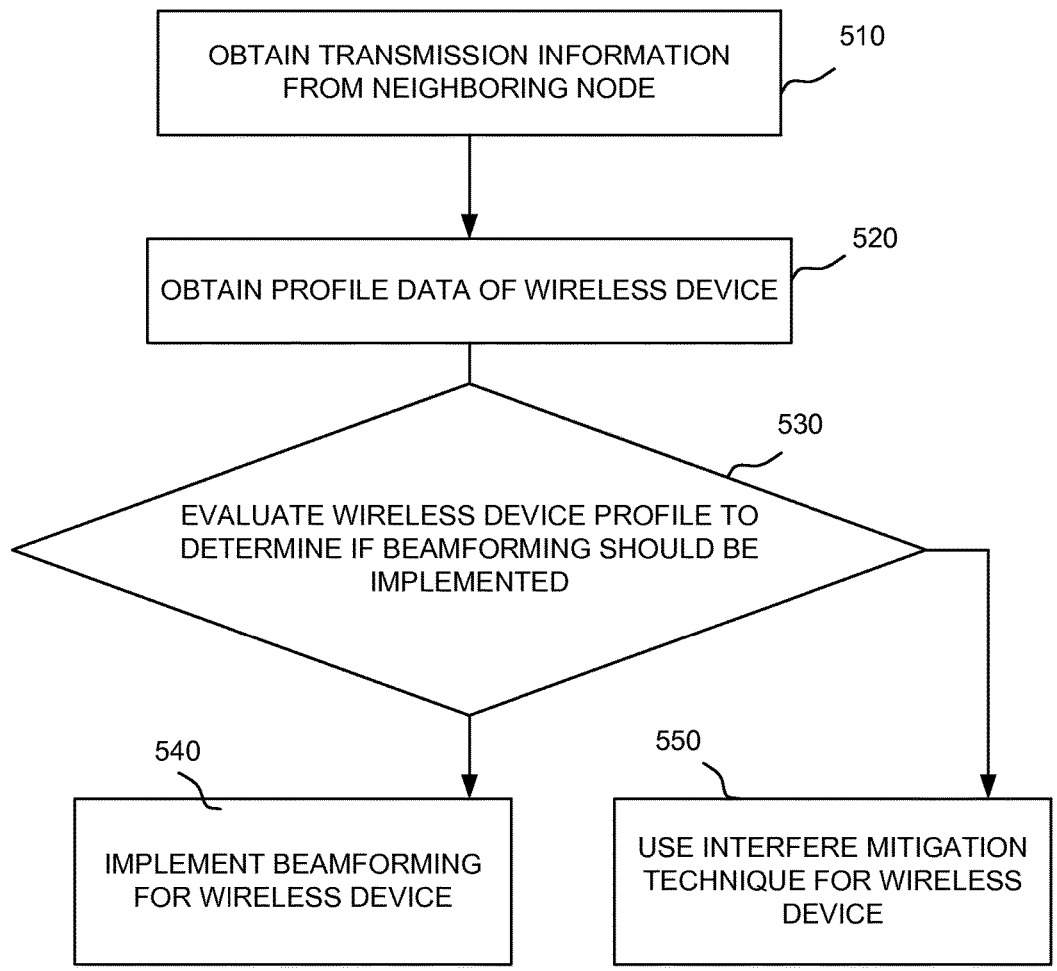
FIG. 5 illustrates an exemplary method of coordinating interference mitigation techniques and beamforming.

FIG. 5 illustrates a method of coordinating interference mitigation techniques and beamforming, according to an exemplary embodiment. At step 510, a communication system (e.g., systems 100, 200, 300, 400 of the exemplary embodiments of FIGS. 1-4) obtains transmission information for various access nodes (e.g., access node 104, 204, 304, 404) of the communication system. For example, a first access node may obtain transmission information from a neighboring access node, such as via the X2 interface between the access nodes. According to an exemplary embodiment, a processor of the access node is configured to receive and process the transmission information. The transmission information may include information regarding the over the air resources used for scheduled transmissions for the access nodes, as described in the exemplary embodiments herein. Thus, the transmission information may be used for interference mitigation techniques, such as those described in regard to the exemplary embodiments of FIGS. 3 and 4.

At step 520, the communication system obtains profile data of wireless devices. For example, in step 520, an access node (e.g., access node 104, 204, 304, 404) obtains the profile data of wireless devices (e.g., wireless devices 102, 202, 320-325, 420-425) within a transmission range (e.g., within signal areas 310, 314, 410, 414) of the access node, which may include one or more wireless devices. According to an exemplary embodiment, the profile data is obtained by an access node during initialization of services between a wireless device and the access node. According to an exemplary embodiment, a processor of the access node is configured to receive and process the profile data for each wireless device within a transmission range of an access node.

According to an exemplary embodiment, the profile data includes one or more types of data regarding characteristics of the wireless device. Various types of wireless device characteristics may be included in the profile data. For example, wireless device profile data may include the application type of an application being used by a wireless device. The application type can indicate whether the application is a relatively delay sensitive application (such as a streaming audio application, a streaming video application, a voice application, and the like) or a relatively delay insensitive application (such as an email application, a messaging application, a web browsing application, and the like).

According to an exemplary embodiment, the profile data includes the mobility of a wireless device. The mobility can comprise a direction of motion, a speed of motion, an average direction and speed of motion over time, and the like. The mobility of a wireless device can be determined based on GPS information of the wireless device, base station triangulation, or other information specifying the geographic location of the wireless device. The mobility of a wireless device can also be determined based on a modulation and coding scheme assigned to a communication link between the wireless device and a serving access node, at least because a modulation and coding scheme can be reduced as the wireless device moves away from the serving access node.

According to an exemplary embodiment, the profile data includes the activity of a wireless device, which indicates how often the wireless device is in use. When a wireless device spends a larger amount of time in active communication with an access node, this can indicate that the wireless device comprises a relatively higher level of interactivity with communication network. Conversely, when a wireless device spends a smaller amount of time in active communication with access node, this can indicate that the wireless device comprises a relatively lower level of interactivity with communication network. According to an exemplary embodiment, the activity of a wireless device may be indicated by an active connection-to-idle connection ratio. The active connection-to-idle connection ratio can indicate a level of interactivity of each wireless device with the communication system. The active connection-to-idle connection ratio can comprise a determination over a period of time of an amount of time that a wireless device is in active communication with an access node and an amount of time that the wireless device is in an idle or lower power state. The active connection-to-idle connection ratio can also comprise a determination over a period of time of a number of times that the wireless device changes from active communication to idle state and vice versa.

According to an exemplary embodiment, the profile data includes the location of a wireless device relative to an access node. For example, the location of a wireless node may be within a central area of a transmission range of an access node (e.g., central signal areas 311, 315, 411, 415 of FIGS. 3 and 4) or within an edge area of a transmission range of an access node (e.g., peripheral signal areas 312, 316, 412, 416 of FIGS. 3 and 4). The location of a wireless device can be determined based on GPS information of the wireless device, base station triangulation, or other information specifying the geographic location of the wireless device. The location of a wireless device can also be determined based on a modulation and coding scheme assigned to a communication link between the wireless device and a serving access node, at least because a modulation and coding scheme can be reduced as the wireless device moves away from the serving access node.

The profile data for a wireless device may include other types of data regarding characteristics of the wireless device than those specifically discussed in the exemplary embodiments described herein, as would be familiar with one skilled in the art.

At step 530, the profile data obtained from the one or more wireless devices is evaluated to determine if beamforming should be implemented for transmissions scheduled for the one or more wireless devices. According to an exemplary embodiment, a processor of the access node is configured to evaluate the profile data and determine if transmission scheduled from the access node should use beamforming. For example, a determination can be made that beamforming should be implemented for transmissions scheduled to a wireless device (e.g., in step 540 of FIG. 5).

As described above, the profile data includes one or more types of data regarding characteristics of the wireless device. Therefore, the evaluation to determine if beamforming should be used may include evaluating whether the profile data meets predetermined criteria. For example, if the application type is a relatively delay sensitive application (such as a streaming audio application, a streaming video application, a voice application, and the like), a determination may be made that the profile data meets criteria for beamforming. In another example, if a wireless device has a low mobility (e.g., is predominantly stationary or moving at a low rate), a determination may be made that the profile data meets criteria for beamforming. Further, if the activity of the wireless device is high (e.g., the wireless device has a low level of idleness), a determination may be made that the profile data meets criteria for beamforming, in another example. A wireless device location indicating that the wireless device is at an edge of a transmission range of an access node (e.g., within peripheral signal areas 312, 316, 412, 416) may meet a criteria for beamforming, in another example. Other criteria may be used for the various types of data included in the profile data of a wireless device than the various examples discussed herein. According to an exemplary embodiment, profile data for a wireless device that meets one or more of these exemplary criteria may be basis for determining that beamforming will be used for transmissions scheduled for the wireless device.

When it is determined that beamforming is not to be used for transmissions scheduled to wireless device, interference mitigation techniques (e.g., the interference mitigation techniques described herein, such as those described in regard to the exemplary embodiments of FIGS. 3 and 4) are used for transmissions scheduled to a wireless device (e.g., in step 550 of FIG. 5).

The exemplary method of FIG. 5 may be carried out for each wireless device within a transmission range of an access node. Further, the exemplary method of FIG. 5 may be carried out so that some transmissions scheduled to wireless devices (e.g., one or more wireless devices) utilize beamforming while other transmissions scheduled to wireless devices (e.g., one or more wireless devices) utilize interference mitigation techniques. According to an exemplary embodiment, the selection of beamforming (e.g., in step 540 in FIG. 5) includes using beamforming for transmissions scheduled for a wireless device without the use of interference mitigation techniques for the transmissions for the wireless device.

Figure 6:
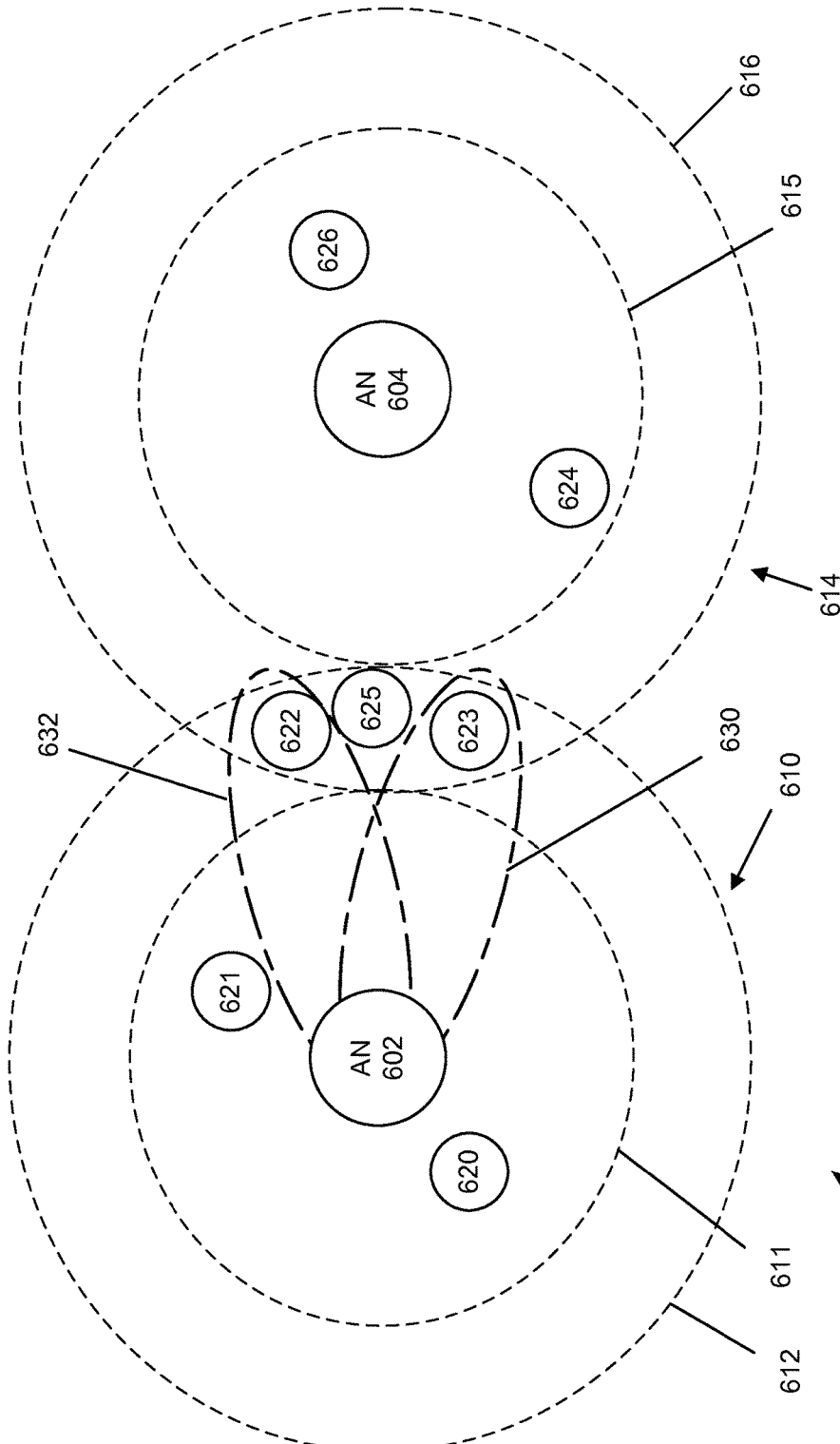
FIG. 6 schematically illustrates an exemplary communication system in which two access nodes potentially interfere with one another and one access node performs beamforming to multiple wireless devices.

An example of a method of coordinating a transmission mode to a wireless device will now be described with reference to the exemplary embodiment of FIG. 6, which depicts an exemplary system 600 that includes access nodes 602, 604 having respective signal areas 610 and 614 (which may be respectively partitioned to central signal areas 611, 615 and peripheral signal areas 612, 616) for transmissions to wireless devices 620-625, similar to the systems 300 and 400 of the exemplary embodiments of FIGS. 3 and 4. As depicted in the exemplary embodiment of FIG. 6, based on an evaluation of profile data for wireless device 623, a determination has been made for access node 602 to perform beamforming. For example, an adjusted beam 630 may be transmitted from access node 602 such that wireless device 623 may experience greater channel quality when communicating with access node 602. Similarly, a determination has been made to perform beamforming for wireless device 622, such as via an adjusted beam 632 from access node 602, based upon the profile data for wireless device 622, while scheduled transmissions to wireless devices 620, 621, and 624-626 may use interference mitigation techniques based upon transmission information exchanged between access nodes 602 and 604.

The determination to perform beamforming for wireless devices 622 and 623 is made by evaluating the profile data of wireless devices 622 and 623 and determining that beamforming would facilitate communication services with wireless devices 622 and 623, according to an exemplary embodiment. Beamforming may be used when one or more types of the profile data indicate that the beamforming would facilitate communication services with a wireless device. For example, beamforming may be selected for wireless devices 622 and 623 when an application type being used by wireless devices 622 and 623 is a relatively delay sensitive application (such as a streaming audio application, a streaming video application, a voice application, and the like), when wireless devices 622 and 623 have low mobility (e.g., is predominantly stationary or moving at a low rate), when the activity of wireless devices 622 and 623 is high (e.g., the wireless device has a low level of idleness), and/or the locations of wireless devices 622 and 623 indicate that wireless devices 622 and 623 are at an edge of a transmission range of an access node (e.g., within peripheral signal areas 612).

Figure 7:
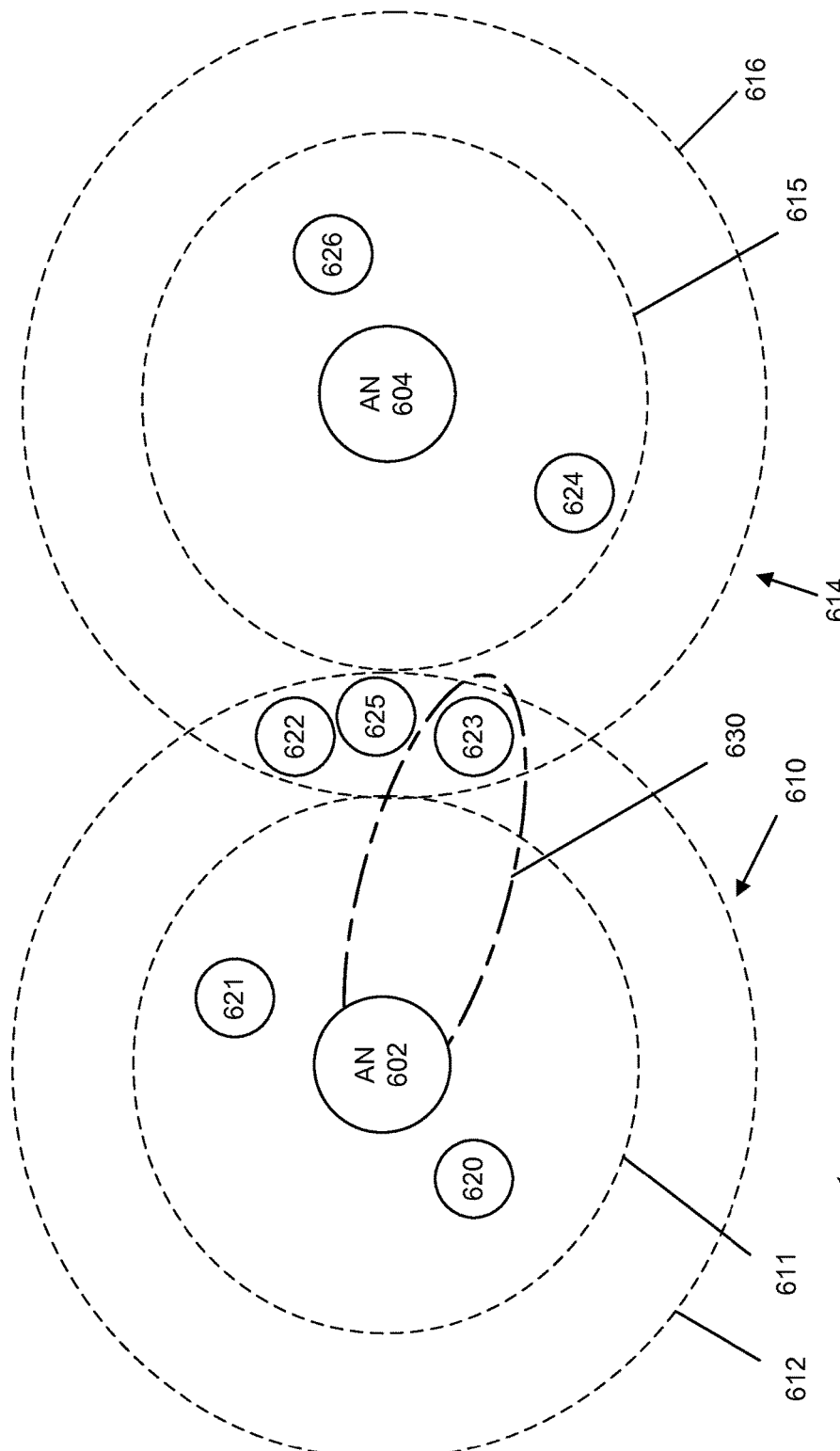
FIG. 7 schematically illustrates the system of FIG. 6 once the profile data for the wireless devices has been updated.

The transmission mode coordination methods of the exemplary embodiments described herein may be repeated over time so that profile data of one or more wireless devices may be updated and the transmission mode for the wireless device may be updated based upon the profile data. Turning to FIG. 7, the system 600 of FIG. 6 is shown after the profile data for wireless devices 620-626 has been updated and a transmission mode for each wireless device has been re-evaluated. As depicted in the exemplary embodiment of FIG. 7, based upon the profile data of wireless device 622, a determination has been made that beamforming is no longer to be used for transmissions scheduled for wireless device 622. For example, the profile data of wireless device 622 may indicate that wireless device 622 is using applications that are relative delay insensitive (e.g., text, email, or other applications), that wireless device 622 has a high mobility (e.g., is moving most of the time), wireless device 622 has a low activity (e.g., has a high level of idleness, such as a majority of time), and/or wireless device 622 has a location indicating that wireless device 622 is located toward a center of a transmission range of an access node (e.g., within a central signal area). Transmissions scheduled for wireless device 622 may use interference mitigation techniques, according to an exemplary embodiment, once the determination has been made that beamforming will not be used for wireless device 622.

The power of transmissions scheduled for a wireless device may be managed based upon profile data to facilitate interference management, according to an exemplary embodiment. For example, the profile data of a wireless device may be evaluated to determine whether a lower transmission power should be used. In the exemplary embodiment of FIG. 6, beamforming may be selected for wireless devices 622 and 623, based upon the profile data of wireless devices 622 and 623, but the power of transmissions to wireless devices 622 and 623 may differ, such as due to their profile data. For example, the profile data of wireless device 622 may indicate that wireless device 622 is using applications that are relative delay insensitive, that wireless device 622 has a high mobility, wireless device 625 has a low activity, and/or wireless device 622 has a location indicating that wireless device 622 is located toward a center of a transmission range of an access node. Conversely, wireless device 623 may have profile data indicating that wireless device 623 is used a relatively delay sensitive application, wireless device 623 has low mobility, the activity of wireless device 623 is high, and/or the locations of wireless device 622 indicates that wireless device 623 is at an edge of a transmission range of an access node. As a result, the power of transmissions to wireless device 622 may be reduced in comparison to transmissions to wireless device 623. According to an exemplary embodiment, information regarding transmissions from an access node to one or more wireless devices may be shared with neighboring access node(s) so the neighboring access node(s) may reduce the power of transmissions at corresponding frequencies to reduce interference. For example, a neighboring access node may reduce the power of transmissions for frequencies used for beamforming for transmissions scheduled for a first access node.

Although the methods of the various exemplary embodiments described herein may perform steps in a particular order for purposes of illustration, the methods of the various exemplary embodiments discussed herein are not limited to any particular order or arrangement. One skilled in the art, using the disclosure provided herein, will appreciate that various steps of the methods can be omitted, rearranged, combined, and/or adapted in various ways.

Figure 8:
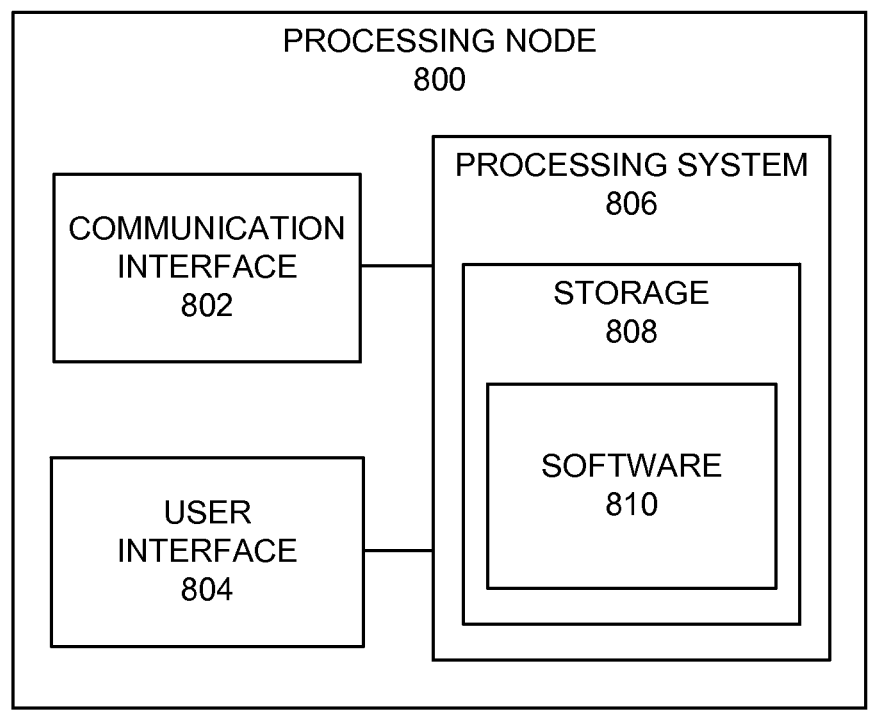
FIG. 8 illustrates an exemplary processing node.

The exemplary embodiment of FIG. 8 illustrates a processing node 800 of a communication system. Processing node 800 comprises communication interface 802, user interface 804, and processing system 806 in communication with communication interface 802 and user interface 804. Processing node 800 can be configured to determine, for example, a communication access node for a wireless device. According to an exemplary embodiment, processing system 806 includes storage 808, which can comprise a disk drive, flash drive, memory circuitry, or other memory device. Storage 808 can store software 810 used in the operation of the processing node 800, according to an exemplary embodiment. Storage 808 may include, for example, a disk drive, flash drive, data storage circuitry, or some other memory apparatus. Software 810 may include, for example, computer programs, firmware, or some other form of machine-readable instructions, including an operating system, utilities, drivers, network interfaces, applications, or some other type of software.

Processing system 806 may include, for example, a microprocessor and other circuitry to retrieve and execute software 810 from storage 808. Processing node 800 may further include other components such as, for example, a power management unit, a control interface unit, etc., which are omitted for clarity. According to an exemplary embodiment, communication interface 802 permits processing node 800 to communicate with other network elements. According to an exemplary embodiment, user interface 804 facilitates the configuration and control of the operation of processing node 800.

Examples of processing node 800 include, for example, controller node 206 and gateway node 208 of the exemplary embodiment of FIG. 2. According to an exemplary embodiment, processing node 800 can be an adjunct or component of a network element, such as an element of access nodes 104, 204, 302, 304, 402, 404, 602, or 604 and the like. Processing node 800 can also be another network element in a communication system, according to an exemplary embodiment. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for coordinating interference mitigation techniques and beamforming, the method comprising:
  obtaining information about transmissions made by at least one access node neighboring a first access node;
  obtaining profile data for a wireless device within a transmission range of the first access node, wherein the profile data includes a wireless device mobility;
  determining that transmissions from the first access node to the wireless device will utilize beamforming, when the wireless device mobility indicates the wireless device is predominantly stationary; and
  instructing the first access node to schedule wireless transmissions to the wireless device utilizing beamforming.

2. The method of claim 1, wherein the profile data further includes at least one of an application type, an activity rate, and a location of the wireless device relative to the first access node.

3. The method of claim 2, wherein the transmissions from the first access node to the wireless device are determined to utilize beamforming when the application type is a delay sensitive application type.

4. The method of claim 2, wherein the transmissions from the first access node to the wireless device are determined to utilize beamforming when the activity rate for the wireless device indicates a low level of idleness.

5. The method of claim 2, wherein the transmissions from the first access node to the wireless device are determined to utilize beamforming when the wireless device is located in a peripheral signal area of the transmission range of the first access node.

6. The method of claim 1, wherein the transmissions from the first access node to the wireless device are determined to utilize interference mitigation techniques, based upon the profile data, and the instructing comprises instructing the first access node to schedule wireless transmissions to the wireless device using the interference mitigation techniques based upon the information about transmissions.

7. The method of claim 1, further comprising:
  updating the profile data for the wireless device, and
  determining whether the transmissions from the first access node to the wireless device should continue to utilize beamforming, based upon the updated profile data.

8. The method of claim 1, further comprising:
  scheduling a transmission of information to the at least one access node neighboring the first access node that beamforming is used for the transmissions from the first access to the wireless device.

9. A system for coordinating interference mitigation techniques and beamforming, the system comprising:
  a first access node comprising a processor configured to:
    obtain information about transmissions made by at least one access node neighboring the first access node;
    obtain profile data for a wireless device within a transmission range of the first access node, wherein the profile data includes an activity rate of the wireless device;
    determine that transmissions from the first access node to the wireless device will utilize beamforming, when the activity rate for the wireless device indicates a low level of idleness; and
    instruct the first access node to schedule wireless transmissions to the wireless device utilizing beamforming.

10. The system of claim 9, wherein the profile data further includes at least one of an application type, a wireless device mobility, and a location of the wireless device relative to the first access node.

11. The system of claim 10, wherein the processor is configured to determine that the transmissions from the first access node to the wireless device are to utilize beamforming when the application type is a delay sensitive application type.

12. The system of claim 10, wherein the processor is configured to determine that the transmissions from the first access node to the wireless device are to utilize beamforming when the wireless device mobility indicates the wireless device is predominantly stationary.

13. The system of claim 10, wherein the processor is configured to determine that the transmissions from the first access node to the wireless device are to utilize beamforming when the wireless device is located in a peripheral signal area of the transmission range of the first access node.

14. The system of claim 9, wherein the processor is configured to determine, based upon the profile data, that the transmissions from the first access node to the wireless device are to utilize interference mitigation techniques, and the instructing comprises the processor instructing the first access node to schedule wireless transmissions to the wireless device using the interference mitigation techniques based upon the information about transmissions.

15. The system of claim 9, further comprising the processor being configured to:
   updating the profile data for the wireless device by receiving updated profile data for the wireless device, and
   determining whether the transmissions from the first access node to the wireless device should continue to utilize beamforming, based upon the updated profile data.

16. The system of claim 9, further comprising the process being configured to schedule a transmission of information to the at least one access node neighboring the first access node that beamforming is used for the transmissions from the first access to the wireless device.

17. A method for coordinating interference mitigation techniques and beamforming, the method comprising:
   obtaining information about transmissions made by at least one access node neighboring a first access node;
   obtaining profile data for a wireless device within a transmission range of the first access node, wherein the profile data includes a location of the wireless device relative to the first access node;
   determining whether transmissions from the first access node to the wireless device will utilize beamforming, when the location of the wireless device is in a peripheral signal area of the transmission range of the first access node, or if the transmissions from the first access node to the wireless device will utilize interference mitigation techniques using the information obtained from the at least one access node neighboring the first access node; and
   instructing the first access node to schedule wireless transmissions to the wireless device utilizing beamforming when it is determined, based on the profile data for the wireless device, that the wireless transmissions will utilize beamforming.

\* \* \* \* \*